(12) United States Patent
Bastioli et al.

(10) Patent No.: US 8,101,253 B2
(45) Date of Patent: Jan. 24, 2012

(54) BIODEGRADABLE MULTIPHASE COMPOSITIONS BASED ON STARCH

(75) Inventors: Catia Bastioli, Novara (IT); Giovanni Floridi, Novara (IT); Gianfranco Del Tredici, Sesto Calende (IT)

(73) Assignee: Novamont S.p.A., Novara (IT)

( * ) Notice: Subject to any disclaimer, the term of this patent is extended or adjusted under 35 U.S.C. 154(b) by 460 days.

(21) Appl. No.: 12/439,297

(22) PCT Filed: Sep. 26, 2007

(86) PCT No.: PCT/EP2007/060223
§ 371 (c)(1),
(2), (4) Date: May 8, 2009

(87) PCT Pub. No.: WO2008/037744
PCT Pub. Date: Apr. 3, 2008

(65) Prior Publication Data
US 2010/0003434 A1    Jan. 7, 2010

(30) Foreign Application Priority Data

Sep. 27, 2006  (IT) .............................. MI2006A1845

(51) Int. Cl.
*B29D 22/00* (2006.01)
*B29D 23/00* (2006.01)
*B32B 1/08* (2006.01)
*B28B 23/00* (2006.01)
(52) U.S. Cl. ..................... 428/36.4; 428/35.7; 428/35.2; 428/220; 428/323; 428/327; 428/338; 428/339; 428/480; 428/532; 523/128; 220/DIG. 30; 383/1; 206/524.6; 206/524.7; 524/47; 442/401
(58) Field of Classification Search ................. 428/35.2, 428/35.7, 36.4, 323, 220, 327, 338, 339, 428/480, 532; 524/47; 523/128; 442/401; 220/DIG. 30; 383/1; 206/524.6, 524.7
See application file for complete search history.

(56) References Cited

FOREIGN PATENT DOCUMENTS

| EP | 0 535 994 | 4/1993 |
|---|---|---|
| EP | 0 965 615 | 12/1999 |
| WO | WO-98-20073 | 5/1998 |
| WO | WO-00-02955 | 1/2000 |
| WO | WO-00-17270 | 3/2000 |
| WO | WO-02-059199 | 8/2002 |
| WO | WO-02-059201 | 8/2002 |
| WO | WO-2006-097353 | 9/2006 |

OTHER PUBLICATIONS

Database CA Chemical Abstracts Service, Columbus, Ohio, US; "Binary mixtures and materials based on biodegradable aliphatic-aromatic polyesters" XP002474013 Jul. 25, 2002.

*Primary Examiner* — Michael C Miggins
(74) *Attorney, Agent, or Firm* — Connolly Bove Lodge & Hutz LLP

(57) ABSTRACT

The present invention relates to biodegradable multiphase compositions characterized in that they comprise three phases: (a) a continuous phase composed of a matrix of at least one tough hydrophobic polymer incompatible with the starch; (b) a nanoparticulate dispersed starch phase with mean dimensions of less than 0.3 μm, (c) a further dispersed phase of at least one rigid and fragile polymer with modulus greater than 1000 MPa. Such compositions having a Modulus greater than 300 MPa and a substantial isotropy in the two longitudinal and transverse directions in relation to tear propagation.

Figure 1:
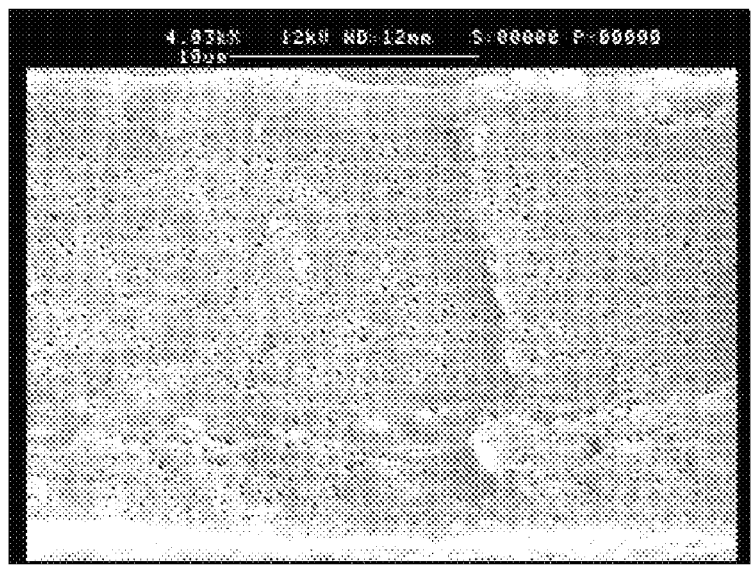

41 Claims, 2 Drawing Sheets

BIODEGRADABLE MULTIPHASE COMPOSITIONS BASED ON STARCH

CROSS REFERENCE TO RELATED APPLICATIONS

This application is a national phase of PCT/EP2007/060223, filed on Sep. 26, 2007, which claims priority to MI 2006A001845, filed on Sep. 27, 2006, the entire contents of which are incorporated herein by reference in their entireties.

The present invention relates to biodegradable multiphase compositions based on starch, capable, particularly, of being transformed into flexible films with high modulus and at the same time provided with isotropy in the two longitudinal and transverse directions, in particular in relation to tear strength. Said films are particularly suitable for producing bags and wrappings capable of supporting heavy weights without severe deformations and without the occurrence of transverse fractures.

The biodegradable multiphase compositions according to the present invention can also be transformed into many other different end products.

The compositions according to the present invention are water insoluble and not water dispersible according to the standard UNI 10956 or EN 14987.

In particular, the present invention relates to biodegradable multiphase compositions characterized by comprising three phases:

A. a continuous phase consisting of a matrix of at least one tough hydrophobic polymer incompatible with starch;
B. a homogeneously dispersed nanoparticulate starch phase with mean dimensions of less than 0.3 μm, preferably less than 0.2 μm, and even more preferably less than 0.15 μm;
C. a further dispersed phase of at least one rigid and fragile polymer with modulus greater than 1000 MPa, preferably greater than 1500 MPa and even more preferably greater than 2000 MPa;

and having:
   a Modulus greater than 300 MPa, preferably greater than 350 MPa, more preferably greater than 400 MPa and even more preferably greater than 450 MPa;
   a substantial isotropy in the two longitudinal and transverse directions in relation to tear propagation,
   particles of the dispersed starch phase (B) with mean dimensions of less than 0.3 μm, preferably less than 0.25 μm, even more preferably less than 0.2 μm and even more preferably less than 0.15 μm;
   a reduction in the dimensions and in the number of the typical lamellar structures of the dispersed phase (C).

Such dimensions of the particles of the dispersed starch phase (B) and such reduction in the dimensions and in the number of the typical lamellar structures of the dispersed phase (C) are obtained by processing the components of said compositions in an extruder, or other machine capable of providing conditions of temperature and shear that determine such reduction in the dimensions of the particles and of the number of the typical lamellar structures.

The dimensions of the particles of starch are measured in the transverse section with respect to the direction of the extrusion flow or, anyhow, with respect to the direction of output of the material.

The dimension of a starch particle is therefore measured on the bidimensional shape resulting from the transverse section. The mean dimension of the starch particles is calculated as the numeral (or arithmetic) average of the dimension of the particles.

In case of a spherical particle the dimension of the particle corresponds to the diameter of a circle.

In case of a non-spherical particle the dimension (d) of the particle is calculated according to the following formula:

$$d = \sqrt{d_1 \cdot d_2}$$

where $d_1$ is the minor diameter and $d_2$ is the major diameter of the ellipse in which the particle can be inscribed or approximated.

One drawback of the starch-based biodegradable bags currently present on the market is represented by the lack of uniformity of the mechanical properties, in particular tear strength, in the transverse and longitudinal directions. Shopping bags measuring 60×60 cm utilized by large-scale retailers are typically made of PE with thicknesses of around 18-20 μm. Nonetheless, at these thicknesses starch-based biodegradable films are still too yielding or too fragile to withstand certain limits of weight (i.e. 10 kg). These limits in performance are particularly apparent in conditions of low humidity.

The aforesaid technical problem has now been solved by the biodegradable compositions based on starch according to the present invention, which, not having transverse displacement of the fracture when they are transformed into bags subjected to load, are particularly advantageous for producing thin films. In fact, the biodegradable compositions according to the invention allow to manufacture bags with thickness in the order of 18-20 μm, and even with thickness lower than 18 μm if needed from a practical application, namely with thickness comparable to that of bags made of medium/high density polyethylene. It is also possible to produce "loop-handle" bags with dimensions of approximately 70×70 cm and thickness of less than 40 μm, i.e. thickness below the thickness of LDPE loop-handle bags, which is in the order of 50 μm. The present compositions are generally biodegradable according to the standard EN 13432.

In particular, the materials according to the present invention comprise:

(A) with regard to the hydrophobic matrix, at least one tough thermoplastic polymer incompatible with the starch, and in the continuous phase between 52 and 70% in weight, and more preferably between 55 and 70% in weight;
(B) with regard to the dispersed starch phase, at least one destructurized nanoparticulate starch in a percentage between 5 and 45% in weight, preferably between 10 and 42% in weight, more preferably between 15 and 38% in weight and even more preferably between 20 and 35%;
(C) with regard to the further dispersed phase, at least one rigid polymer between 3 and 25% in weight, preferably between 4 and 22% in weight and more preferably between 5 and 20% in weight.

To obtain a material with rigidity and tenacity in the two transverse and longitudinal directions superior to the materials described in prior art, use is made of specific weight ratios of the various components, and to use a process in the extruder or any other machine, capable of providing temperature and shear conditions that allow reduction of the dispersed phases in very small particles. In particular, the lamellar structures typical of the phase (C) must be substantially reduced in dimension and possibly eliminated.

In general, the most suitable extrusion systems are those that make use of laminating screws with a ratio between the maximum and minimum diameter of the screw of less than 1.6, and more preferably less than 1.4.

With regard to the hydrophobic matrix, tough polyesters can be used, i.e., those characterized by Modulus of less than 200 MPa and ultimate elongation greater than 500%, such as the aliphatic aromatic polyesters from diacid/diol of the type described in EP 559 785 (Eastman), EP 792 309 (BASF) and WO 2006/097353 (Novamont). Within the limits indicated, aliphatic polyesters from diacid/diol of the type described in EP 1 117 738 are also taken into consideration here.

Polyesters in which the aliphatic acids are chosen from at least one of the following: succinic, adipic, azelaic, sebacic, undecandioic, dodecandioic, brassylic acid or mixtures thereof, are particularly preferred.

With regard to the hydrophobic matrix, biodegradable polymers such as polyhydroxyalkanoates, polyesters and polyamides can also be used.

During the polymer synthesis process various additives such as polycarbodiimides, polyepoxy resins, peroxides and oxazolines can be added. Particularly polyepoxy resins can be advantageously added as additives in order to stabilize the final multiphase composition against hydrolysis. Particularly preferred are resins of the glycidyl type. Still more preferred is BADGE (bisphenol A diglycidyl ether).

With regard to the starch phase, all native starches, such as potato, corn, tapioca, pea, rice, wheat and also high-amylose starch—preferably containing more than 30% by weight of amylose—and waxy starches, can be used.

Starches such as corn and potato starch, capable of being easily destructurizable and which have high initial molecular weights, have proven to be particularly advantageous.

The use of corn and potato starch is particularly preferred.

For destructurized starch the teachings contained in EP 0 118 240 and EP 0 327 505 are referred to here, this being intended as starch processed so that it substantially has no "Maltese crosses" under the optical microscope in polarized light and no "ghosts" under the optical microscope in phase contrast.

Furthermore, physically and chemically modified starch grades can be in part used, such as ethoxylated starches, oxypropylated starches, starch acetates, starch butyrate, starch propionates, with a substitution degree comprised within the range of from 0.1 to 2, cationic starches, oxidized starches, crosslinked starches, gelled starches.

Finally, with regard to the further dispersed phase of a rigid polymer, polyhydroxyalkanoates with modulus greater than 1000 MPa can be used, such as polylactic acid and polyglycolic acid. Particularly preferred are polymers or copolymers of polylactic acid containing at least 75% of L-lactic or D-lactic acid or combinations thereof, with molecular weight $M_w$ greater than 70,000 and with a modulus greater than 1,500 MPa. These polymers can also be plasticized.

In the formation phase of the multiphase structure of the present biodegradable compositions there must be at least one plasticizer for the starch to provide suitable Theological properties and minimize the dimensions of the starch phase. This plasticizer can simply be water (even the water contained in the native starch alone without the need for further additions), or self-boiling or polymer plasticizers. The quantity of plasticizer is as a rule chosen on the basis of rheological needs and of the mixing system.

In any case, plasticizers can be added in a quantity of less than 10% in relation to the components (A+B+C). Besides water, plasticizers that can be utilized in the compositions according to the invention are, for example, those described in WO 92/14782, with glycerol as the particularly preferred plasticizer.

In the present biodegradable compositions various additives can also be incorporated, such as antioxidants, UV stabilizers, heat and hydrolysis stabilizers, chain extenders, flame retardants, slow release agents, inorganic and organic fillers, such as natural fibres, antistatic agents, wetting agents, colorants, lubricants or compatibilizing agents among the various phases.

Examples of hydrolysis stabilizers are polycarbodiimides and epoxy resins.

Among polycarbodiimides particularly preferred are aliphatic polycarbodiimides.

Among epoxy resins particularly preferred are epoxidized polymethacrylates, in particular of the glycidyl type. The most preferred is a poly epoxy propyl methacrylate.

Example of chain extenders are peroxides. Among peroxides particularly preferred are organic peroxides.

Thanks to the dispersed nanoparticulate starch phase, the biodegradable multiphase compositions according to the invention are particularly suitable for being transformed into flexible films with high modulus and at the same time provided with isotropy in the two longitudinal and transverse directions, in particular in relation to tear strength. Said films are particularly suitable for producing bags and wrappings capable of supporting heavy weights without severe deformations and without the occurrence of transverse fractures.

The films obtained from the biodegradable multiphase composition according to the invention can also be used to make sacks and bags for carrying goods, film and bags for food packaging, stretchable, heat-shrinkable film, film for adhesive tape, for disposable nappy tapes and for decorative coloured tapes. Some other main applications are for silage, for breathable bags for fruit and vegetables, bags for bread and other food products, film for covering packs of meats, cheese and other food items and yoghurt pots.

Due to their properties, the biodegradable multiphase compositions according to the invention can also find application in the field of textiles and non-woven fabric for clothing, co-extruded fibers and spun bonded, hygiene and industrial products, and also for fishing nets or nets fruit and vegetables.

The fine microstructure can be useful also for injection molded, foamed and extruded products with a need of high toughness. Moreover this type of material can be used in co-extruded multilayer films, laminated products where the supports can be either other plastic films/sheets or paper, aluminium or their combinations.

The present invention is now illustrated with reference to some non-limiting examples thereof.

EXAMPLES

TABLE 1

| Example | Potato starch | Ecoflex 7025 ® | Ecopla ® 4042D | $H_2O$ | Lubricant |
|---------|---------------|----------------|----------------|--------|-----------|
| 1       | 32            | 67             | 7              | 3      | 0.3       |
| 2       | 32            | 61.2           | 12.8           | 3      | 0.3       |

The compositions are expressed in parts. Ecoflex® is a polybutylene adipate-co-terephthalate produced by BASF AG. Ecopla® is a polylactic acid produced by Cargill.

The compositions indicated in Table 1 were fed to a co-rotating extruder with L/D=36 and diameter 60 mm provided with 9 heating zones.

The extrusion parameters are as follows.

RPM: 140

Flow rate: 40 kg/hour

Thermal profile 60-140-175-180×4-155×2° C.

Screw diameter ratio (max. diam./min. diam.) 1.31-1.35
Ratio between transport and mixing zones: 2:1
Degassing in zone 8 out of 10
Final water content of the granule equal to 0.8%

The compositions of Table 1 were filmed on a 40 mm Ghioldi machine, die gap=1 mm, flow rate 20 kg/h to obtain film with a thickness of 20 μm.

The 20 μm films were then subjected to mechanical characterization according to the standard ASTM D882 (traction at 23° C. and 55%; Relative humidity and Vo=50 mm/min).

The results are indicated in Table 2 below.

TABLE 2

| SAMPLE | | δy (MPa) | εy (%) | δb (MPa) | εb (%) | E (MPa) | Enb (KJ/M2) |
|---|---|---|---|---|---|---|---|
| 1 | Long | 9.5 | 4 | 37 | 255 | 412 | 3312 |
| 2 | Long | 12 | 3 | 38 | 205 | 603 | 2542 |

The 20 μm films were then subjected to mechanical characterization according to the standard ASTM D1938 (tearing in conditions 10° C.; <5% RH and Vo 1 m/sec).

The results are indicated in Table 3 below.

TABLE 3

| | | Tear propagation | |
|---|---|---|---|
| SAMPLE | | Fmax (N/mm) | $En_b$ (KJ/m$^2$) |
| 1 | Long | 92 | 99 |
| | Transv | 100 | 120 |
| 2 | Long | 55 | 60 |
| | Transv | 42 | 48 |

Tests did not show propagation of any lateral fractures.

The 20 μm films produced with the composition of example 1 and 2 were fractured, subjected to etching in acetone to eliminate the polylactic acid and microphotography was performed with ×4000 magnification under the Scanning Electron Microscope (SEM). FIG. 1 shows the transverse fracture of film sample 1

Figure 2:
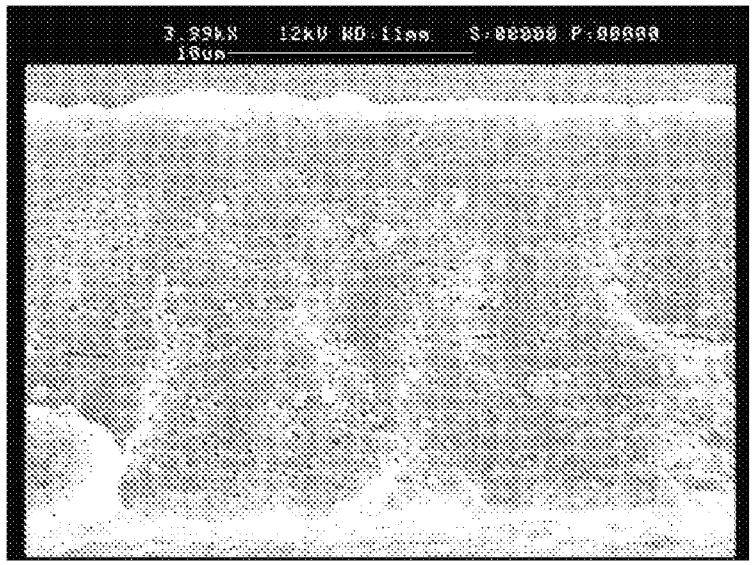
Figure 3:
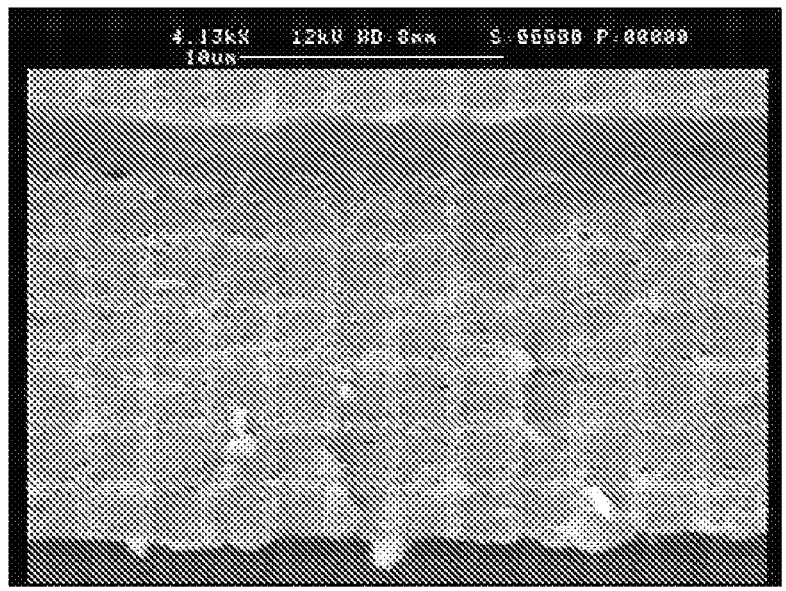
Figure 4:
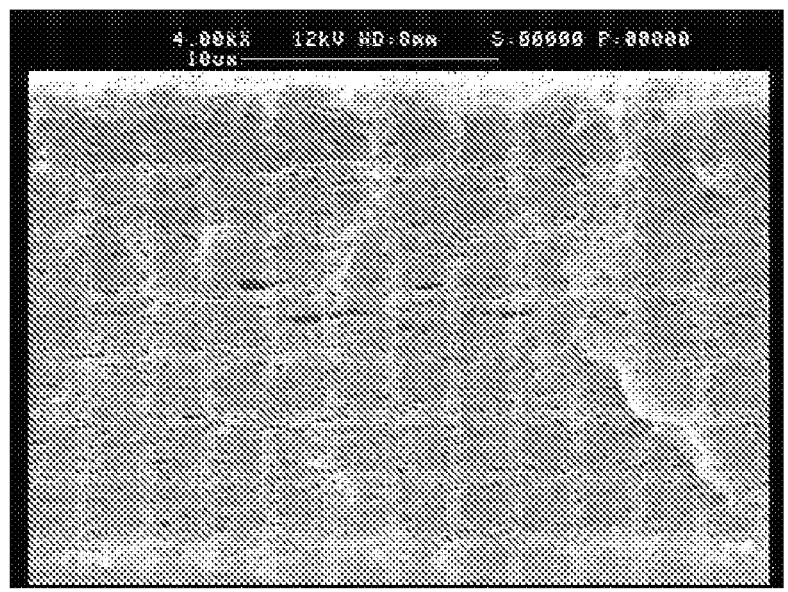

FIG. 2 shows the longitudinal fracture of film sample 1
FIG. 3 shows the transverse fracture of film sample 2
FIG. 4 shows the longitudinal fracture of film sample 2

The microphotographs in cross section show the presence of only a few sparse lamellae.

The invention claimed is:

1. Biodegradable composition characterized by comprising three phases:
   A. a continuous phase consisting of a matrix of at least one tough hydrophobic polymer incompatible with starch, said tough thermoplastic polymer having a Modulus of less than 200 MPa;
   B. a homogeneously dispersed nanoparticulate starch phase;
   C. a further dispersed phase of at least one polymer with modulus greater than 1000 MPa, said polymer being a polyhydroxyalkanoate;
   and having:
      a Modulus greater than 300 MPa;
      a substantial isotropy in the two longitudinal and transverse directions in relation to tear propagation;
      particles of the dispersed starch phase (B) with mean dimensions of less than 0.3 μm.

2. Biodegradable composition according to claim 1, characterized by a Modulus greater than 350 MPa, in which said polymer of said further dispersed phase (C) has a modulus greater than 1500 MPa, and said particles of said dispersed starch phase (B) have mean dimensions of less than 0.25 μm.

3. Biodegradable composition according to claim 1, characterized by a Modulus greater than 400 MPa, in which said polymer of said further dispersed phase (C) has a modulus greater than 2000 MPa, and said particles of said dispersed starch phase (B) have mean dimensions of less than 0.2 μm.

4. Biodegradable composition according to claim 1, characterized by a Modulus greater than 450 MPa, in which said polymer of said further dispersed phase (C) has a modulus greater than 2000 MPa, and said particles of said dispersed starch phase (B) have mean dimensions of less than 015 μm.

5. Biodegradable composition according to claim 1, characterized in that:
   (A) said continuous phase comprises said at least one tough thermoplastic polymer incompatible with the starch in an amount of from 52 to 70% by weight;
   (B) said dispersed nanoparticulate starch phase comprises at least one destructurized nanoparticulate starch in an amount of from 5 to 45% by weight;
   (C) said further dispersed phase comprises said polyhydroxyalkanoate in an amount from 3 to 25% by weight.

6. Biodegradable composition according to claim 1, characterized in that:
   (A) said continuous phase comprises said at least one tough thermoplastic polymer incompatible with the starch in an amount of from 55 to 70% by weight;
   (B) said dispersed nanoparticulate starch phase comprises at least one destructurized nanoparticulate starch in an amount of from 10 to 42% by weight;
   (C) said further dispersed phase comprises said polyhydroxyalkanoate in an amount from 4 to 22% by weight.

7. Biodegradable compositions according to claim 1, characterized in that the ultimate elongation is greater than 500%.

8. Biodegradable compositions according to claim 1, characterized in that said tough thermoplastic polymer is selected from the group consisting of aliphatic-aromatic polyesters, polyhydroxyalkanoates, polyesters and polyamides.

9. Biodegradable compositions according to claim 1, characterized in that said tough thermoplastic polymer is an aliphatic-aromatic polyester.

10. Biodegradable compositions according to claim 1, characterized in that said polyhydroxyalkanoate is a polymer or copolymer of polylactic acid containing at least 75% of L-lactic or D-lactic acid or combinations thereof, with molecular weight $M_w$ greater than 70,000 and with a modulus greater than 1,500 MPa.

11. Biodegradable compositions according to claim 1, characterized in that said dimensions of the particles of the dispersed starch phase (B) and said reduction in the dimensions and in the number of the typical lamellar structures of the dispersed phase (C) ate obtained by processing the components of said compositions in an extruder, or other machine capable of providing conditions of temperature and shear that determine such reduction in the dimensions of the particles and of the number of the typical lamellar structures.

12. Biodegradable composition according to claim 1, characterized in that:
   (B) said dispersed nanoparticulate starch phase comprises at least one destructurized nanoparticulate starch in an amount of from 15 to 38% by weight;
   (C) said further dispersed phase comprises said polyhydroxyalkanoate in an amount from 5 to 20% by weight.

13. Biodegradable composition according to claim 12, characterized in, that:

(B) said dispersed nanoparticulate starch phase comprises at least one destructurized nanoparticulate starch in an amount of from 20 to 35% by weight.

14. Biodegradable compositions according to claim 1, characterized in that said tough thermoplastic polymer is an aliphatic aromatic polyester is of the diacid/diol type.

15. Biodegradable compositions according to claim 14, characterized in that said aliphatic aromatic polyester of the diacid/diol type contains as aliphatic acid an acid selected from the group consisting of succinic, adipic acid, azelaic acid, sebacic acid, undecandioic, dodecandioic, brassylic acid, or mixtures thereof.

16. Biodegradable compositions according to claim 1, characterized in that said matrix of at least one tough hydrophobic polymer contains additives selected from the group consisting of polycarbodiimides, polyepoxy resins, peroxides and oxazolines.

17. Biodegradable compositions according to claim 16, characterized in that said additives are polyepoxy resins of bisphenol A diglycidyl ether.

18. Biodegradable compositions according to claim 1, characterized in that said homogeneously dispersed starch phase (B) consists of native starch.

19. Biodegradable compositions according to claim 18, characterized in that said native starch is selected from the group consisting of potato, corn, tapioca, pea, rice, wheat high-amylose starch.

20. Biodegradable compositions according to claim 18, characterized in that said native starch contains more than 30% by weight of amylose and waxy starch.

21. Biodegradable compositions according to claim 18, characterized in that said native starch is destructurized native starch.

22. Biodegradable compositions according to claim 21, characterized in that said destructurized native starch is potato and corn starch.

23. Biodegradable compositions according to claim 22, characterized in that said destructurized native starch is potato starch.

24. Biodegradable compositions according to claim 1, characterized in that the dispersed starch phase (B) consists of physically and chemically modified starches.

25. Biodegradable compositions according to claim 24, characterized in that said physically and chemically modified starches are selected from the group consisting of ethoxylated starches, oxypropylated starches, starch acetates, starch butyrate, starch propionates, with a substitution degree comprised within the range of from 0.1 to 2, cationic starches, oxidized starches, cross-linked starches, gelled starches.

26. Biodegradable compositions according to claim 1, characterized in that in the formation phase of the multiphase structure, at least one plasticizer for the starch is present.

27. Biodegradable compositions according to claim 26, characterized in that said plasticizer is present in a quantity of less than 10% with respect to the sum of (A+B+C).

28. Biodegradable compositions according to claim 26, characterized in that said plasticizer is water or glycerol or mixtures of both.

29. Biodegradable compositions according to claim 26, characterized in that said plasticizer is the water contained in the native starch.

30. Biodegradable compositions according to claim 1, characterized in that in the formation phase of the multiphase structure, additives other than plasticizers are added.

31. Biodegradable compositions according to claim 30, characterized in that said additives are antioxidants, UV stabilizers, heat and hydrolysis stabilizers, chain extenders, flame retardants, slow release agents, inorganic and organic fillers, such as natural fillers, antistatic agents, wetting agents, colorants, lubricants or compatibilizing agents between the various phases.

32. Biodegradable compositions according to claim 31, characterized in that said hydrolysis stabilizers are carbodiimides or epoxy resins.

33. Biodegradable compositions according to claim 32, characterized in that said carbodiimides are aliphatic carbodiimides.

34. Biodegradable compositions according to claim 32, characterized in that said epoxy resins are epoxidized polymethacrylates.

35. Biodegradable compositions according to claim 34, characterized in that said epoxidized polymethacrylates are of the glycidyl type.

36. Biodegradable compositions according to claim 35, characterized in that said epoxidized polymethacrylate of the glycidyl type is a poly epoxy propyl methacrylate.

37. Film produced with multiphase biodegradable compositions as claimed in claim 1.

38. Bags or sacks extruded or thermoformed, laminated with paper, aluminium, plastic and bioplastics, multiperforated produced with film according to claim 37.

39. Use of bags according to claim 38 for carrying goods, for food packaging, breathable bags for fruit and vegetables, bags for bread and other food products.

40. Substantially water insoluble biodegradable multiphase compositions according to claim 1.

41. Textiles articles or non-woven fabric for clothing, co-extruded fibers or spun-bonded, hygiene and industrial products, including fishing nets or nets for fruit and vegetables produced with the substantially water insoluble biodegradable multiphase compositions of claim 40.

* * * * *